United States Patent
Gopireddy et al.

(10) Patent No.: US 9,863,719 B2
(45) Date of Patent: Jan. 9, 2018

(54) HEAT EXCHANGER SUPPORT ASSEMBLY

(71) Applicant: Caterpillar Inc., Peoria, IL (US)

(72) Inventors: Sudhakara Reddy Gopireddy, Dunlap, IL (US); Hardik Hasmukhlal Shah, Peoria, IL (US); Sumeeth Shantharaju Sivanagere, Dunlap, IL (US); Jianlong Xu, Peoria, IL (US); Steven James Eveker, Peoria, IL (US); Dongming Tan, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 420 days.

(21) Appl. No.: 14/497,679

(22) Filed: Sep. 26, 2014

(65) Prior Publication Data

US 2016/0091261 A1    Mar. 31, 2016

(51) Int. Cl.
| | | |
|---|---|---|
| *F28F 9/007* | (2006.01) | |
| *B60K 11/04* | (2006.01) | |
| *F01P 3/18* | (2006.01) | |
| *F28F 9/00* | (2006.01) | |
| *B60K 11/02* | (2006.01) | |
| *F28D 21/00* | (2006.01) | |

(52) U.S. Cl.
CPC ............ *F28F 9/0075* (2013.01); *B60K 11/02* (2013.01); *B60K 11/04* (2013.01); *F01P 3/18* (2013.01); *F28F 9/001* (2013.01); *F28F 9/002* (2013.01); *F28F 9/007* (2013.01); *B60Y 2200/252* (2013.01); *B60Y 2200/415* (2013.01); *F28D 2021/008* (2013.01)

(58) Field of Classification Search
CPC ...... F28F 9/001; F28F 9/002; F28F 2009/004; F28F 9/0075; B60K 11/04; F01P 3/18; F01P 2003/182; F01P 2003/185; F01P 2003/184; F01P 2070/52
USPC ..................................... 165/53, 67, 145, 149
See application file for complete search history.

(56) References Cited

U.S. PATENT DOCUMENTS

| | | | | |
|---|---|---|---|---|
| 3,627,035 | A * | 12/1971 | Astrup .................... | F28F 9/001 165/149 |
| 4,367,793 | A * | 1/1983 | MacIntosh .............. | F28F 9/002 165/149 |
| 4,382,464 | A * | 5/1983 | Melnyk ................... | F28F 9/001 165/149 |
| 4,619,313 | A * | 10/1986 | Rhodes ................... | F28F 9/001 165/149 |
| 4,763,723 | A * | 8/1988 | Granetzke .............. | B60K 11/04 165/67 |
| 5,257,662 | A * | 11/1993 | Osborn ................... | F28F 9/001 165/149 |

(Continued)

FOREIGN PATENT DOCUMENTS

| | | |
|---|---|---|
| DE | 10149178 | 10/2000 |
| KR | 2012/0057348 | 11/2010 |
| WO | WO 2006/132170 | 6/2005 |

*Primary Examiner* — Davis Hwu
*Assistant Examiner* — Hans Weiland
(74) *Attorney, Agent, or Firm* — Finnegan, Henderson, Farabow, Garrett & Dunner, LLP

(57) ABSTRACT

A support assembly is disclosed for use with a heat exchanger. The heat exchanger support assembly may include a frame configured to receive a heat exchanger. The frame may include a top section, a bottom section, and first and second side sections. The heat exchanger support assembly may also include at least one support member configured to mount a tank associated with the heat exchanger to the frame.

6 Claims, 4 Drawing Sheets

(56) References Cited

U.S. PATENT DOCUMENTS

| | | | | |
|---|---|---|---|---|
| 5,341,871 | A | * | 8/1994 | Stelzer .................... F28F 9/002 165/121 |
| 5,360,059 | A | * | 11/1994 | Olson ..................... F28F 9/001 165/67 |
| 5,482,114 | A | * | 1/1996 | Lu .......................... F28F 9/001 165/149 |
| 6,308,795 | B2 | | 10/2001 | Sewell |
| 6,386,273 | B1 | * | 5/2002 | Hateley .................. F28F 9/002 165/149 |
| 6,715,573 | B2 | | 4/2004 | Emori et al. |
| 7,121,369 | B2 | | 10/2006 | Beck et al. |
| 7,441,620 | B2 | * | 10/2008 | Riniker .................. B60K 11/04 165/178 |
| 8,393,425 | B2 | | 3/2013 | Matsuzaki |
| 2006/0196052 | A1 | * | 9/2006 | Lesage .................. F28F 9/0229 29/890.043 |
| 2013/0199862 | A1 | | 8/2013 | Ogawara et al. |
| 2013/0264039 | A1 | | 10/2013 | Kis et al. |
| 2014/0034409 | A1 | | 2/2014 | Nakamura et al. |
| 2014/0116658 | A1 | | 5/2014 | Kappelman et al. |
| 2014/0262147 | A1 | * | 9/2014 | Pawlick .................. F28F 9/001 165/67 |

\* cited by examiner

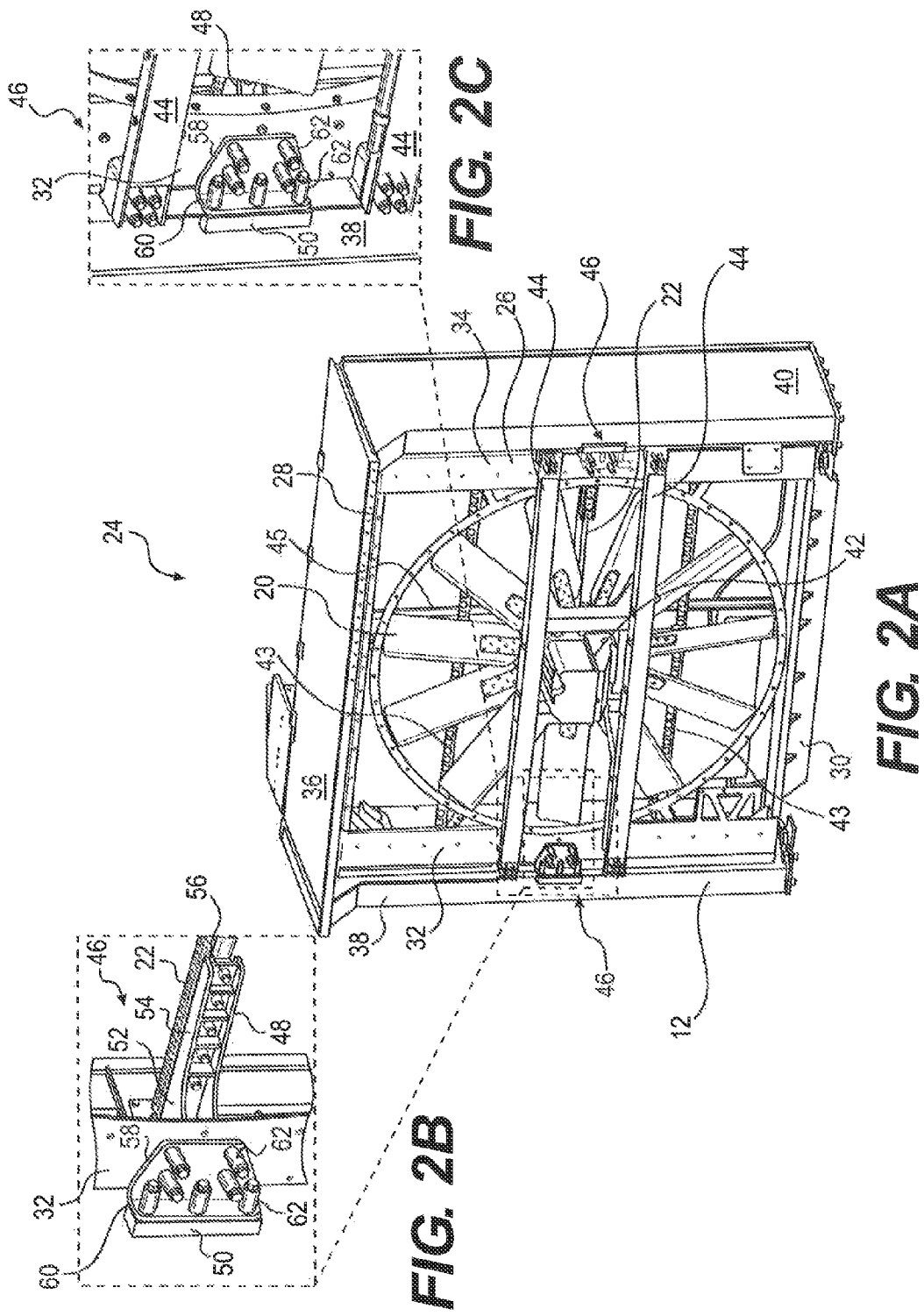

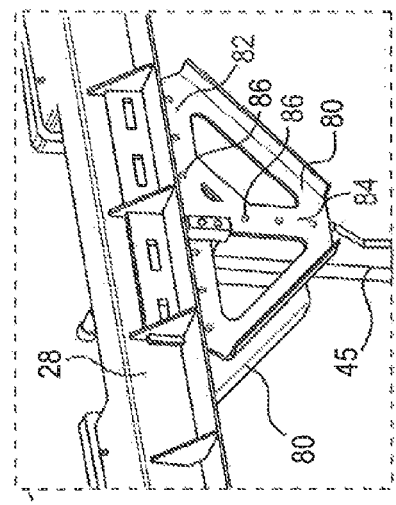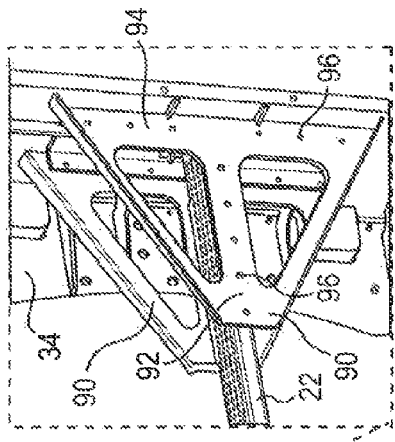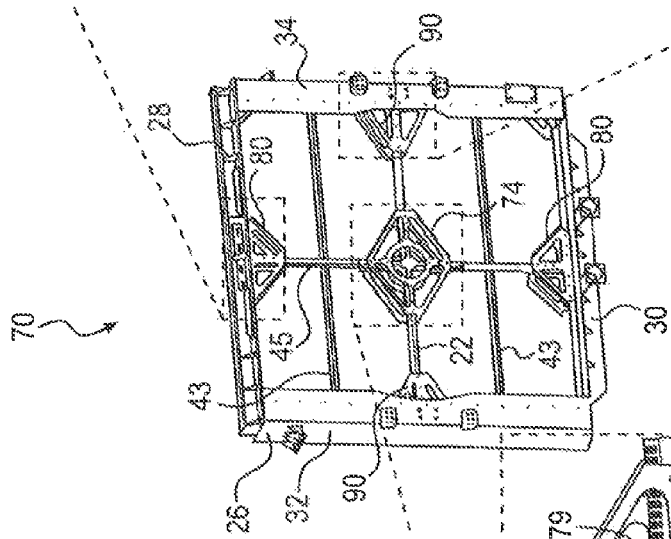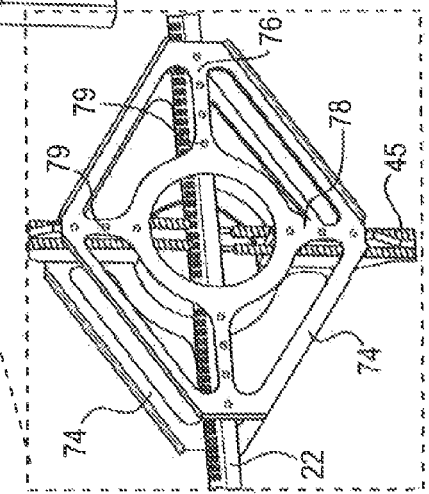

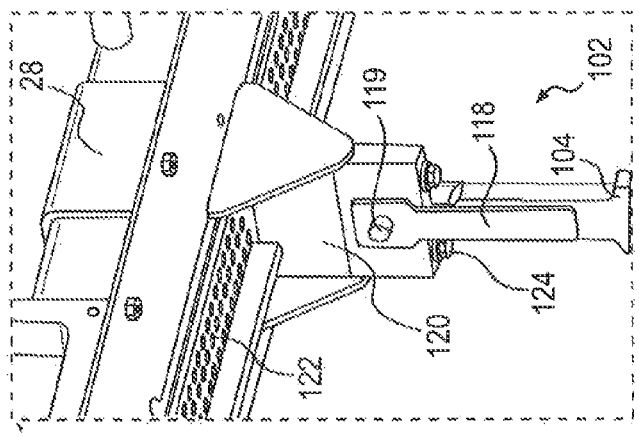
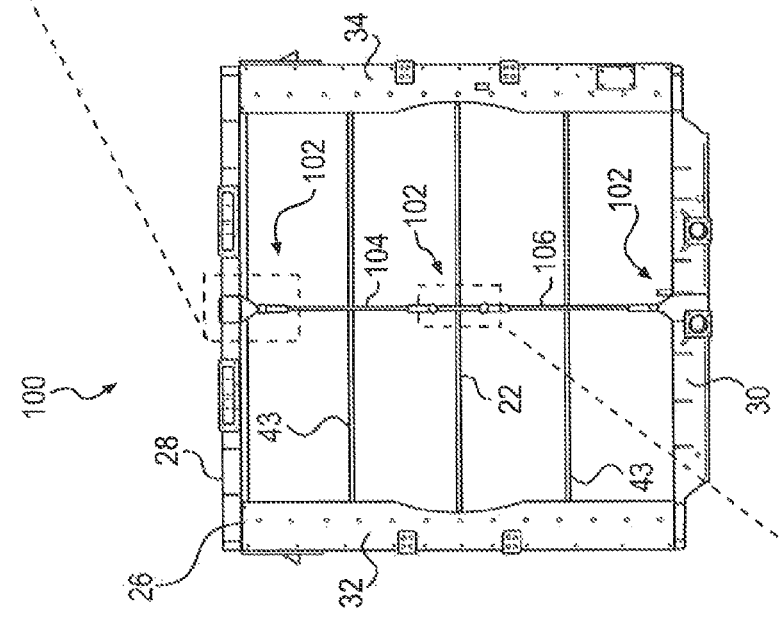
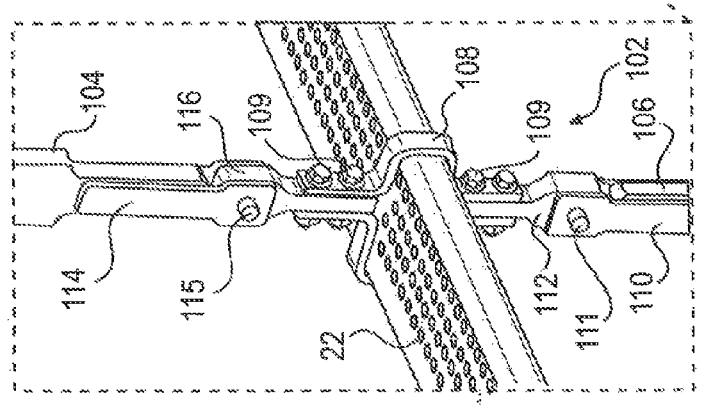

HEAT EXCHANGER SUPPORT ASSEMBLY

TECHNICAL FIELD

The present disclosure relates generally to a support assembly and, more particularly, to a support assembly for a heat exchanger.

BACKGROUND

Many mobile machines are powered by an internal combustion engine, for example a diesel engine, a gasoline engine, or a gaseous-fuel powered engine. Each of these engines combusts a mixture of fuel and air to generate a mechanical power output used to propel the machine. To ensure optimum combustion of the fuel/air mixture and to protect components of the engine from damaging extremes, temperatures of the engine and air drawn into the engine for combustion should be tightly controlled.

Typical internal combustion engines are cooled by way of one or more heat exchangers and an axial cooling fan disposed adjacent (e.g., in front of or behind) the heat exchangers. Coolants from the engine are circulated through the heat exchangers, while the axial cooling fan directs a flow of fresh air through the heat exchangers to absorb heat from the coolants. The coolants, having dissipated heat to the air, are then circulated back through the engine to cool the engine. The air, after having absorbed heat from the heat exchangers, is subsequently directed to the atmosphere.

A heat exchanger is typically mounted on a machine frame. During machine operation, the heat exchangers can experience large vibrational forces, for example, due to bumps in a road on which the machine travels. Because of the size and weight of some heat exchangers, these vibrational forces can cause movement (e.g., flexing) in some sections of the heat exchanger, which can lead to cracking, leakage, and/or failure of the heat exchanger. To reduce the flexing and/or other movements of the heat exchanger, the heat exchanger may be equipped with a support assembly to secure the heat exchanger during machine operation.

An exemplary support assembly for a heat exchanger is disclosed in U.S. Patent Application Publication No. US 2013/0264039 A1 to Kis et al. that published on Oct. 10, 2013 (the '039 publication). Specifically, the '039 publication describes a heat exchanger assembly including a plurality of core units and an intermediate tank joined to the plurality of core units. The heat exchanger assembly also includes a structural frame having two opposing end channels and two opposing side channels. The structural frame also includes a center rail extending between the side channels, and two cross bars extending diagonally between the end channels. The center rail and the cross bars help to strengthen the heat exchanger assembly and secure the core units within the heat exchanger assembly.

Although the heat exchanger assembly of the '039 publication may be adequate for some applications, it may still be less than optimal. In particular, the center rail and the cross bars of the '039 publication can restrict air flow that is drawn through the heat exchanger assembly, thereby reducing an efficiency of the heat exchanger. In addition, the structural frame of the '039 publication can also experience large vibrational forces. Without any additional support for the structural frame, these vibrational forces can cause damage to one or more components of the heat exchanger.

The disclosed support assembly is directed to overcoming one or more of the problems set forth above and/or other problems of the prior art.

SUMMARY

In one aspect, the present disclosure is directed to a heat exchanger support assembly. The heat exchanger support assembly may include a frame configured to receive a heat exchanger. The frame may include a top section, a bottom section, and first and second side sections. The heat exchanger support assembly may also include at least one support member configured to mount a tank associated with the heat exchanger to the frame.

In another aspect, the present disclosure is directed to a heat exchanger support assembly for a machine. The heat exchanger support assembly may include a heat exchanger frame configured to receive a heat exchanger, and a machine frame configured to receive the heat exchanger frame. The heat exchanger support assembly may also include a first bracket configured to mount a tank associated with the heat exchanger to the heat exchanger frame, and a second bracket configured to mount the heat exchanger frame to the machine frame. The second bracket may be connected to the first bracket.

In yet another aspect, the present disclosure is directed to a machine. The machine may include a machine frame, a heat exchanger including a lower section supported by the machine frame and an upper section mounted above the lower section, and a fan located at one side of the heat exchanger and configured to generate a flow of air through the heat exchanger. The machine may also include a tank fluidly connected to the lower and upper sections to provide a reservoir for fluids passing through the heat exchanger, and a heat exchanger frame positioned inward of the machine frame and configured to receive the heat exchanger. The machine may further include a first bracket configured to mount the tank to the heat exchanger frame, and a second bracket configured to mount the heat exchanger frame to the machine frame. The second bracket may be connected to the first bracket.

BRIEF DESCRIPTION OF THE DRAWINGS

FIG. 2A is an isometric illustration of an exemplary disclosed support assembly that may be used in conjunction with the heat exchanger of FIG. 1;

FIG. 2B is an enlarged isometric illustration of a portion of the support assembly of FIG. 2A;

FIG. 2C is another enlarged isometric illustration of a portion of the support assembly of FIG. 2A;

FIG. 3A is an isometric illustration of another exemplary disclosed support assembly that may be used in conjunction with the heat exchanger of FIG. 1;

FIG. 3B is an enlarged isometric illustration of a portion of the support assembly of FIG. 3A;

FIG. 3C is an enlarged isometric illustration of another portion of the support assembly of FIG. 3A;

FIG. 3D is an enlarged isometric illustration of yet another portion of the support assembly of FIG. 3A;

FIG. 4A is an isometric illustration of yet another exemplary disclosed support assembly that may be used in conjunction with the heat exchanger of FIG. 1;

FIG. 4B is an enlarged isometric illustration of a portion of the support assembly of FIG. 4A; and FIG. 4C is an enlarged isometric illustration of another portion of the support assembly of FIG. 4A.

DETAILED DESCRIPTION

Figure 1:
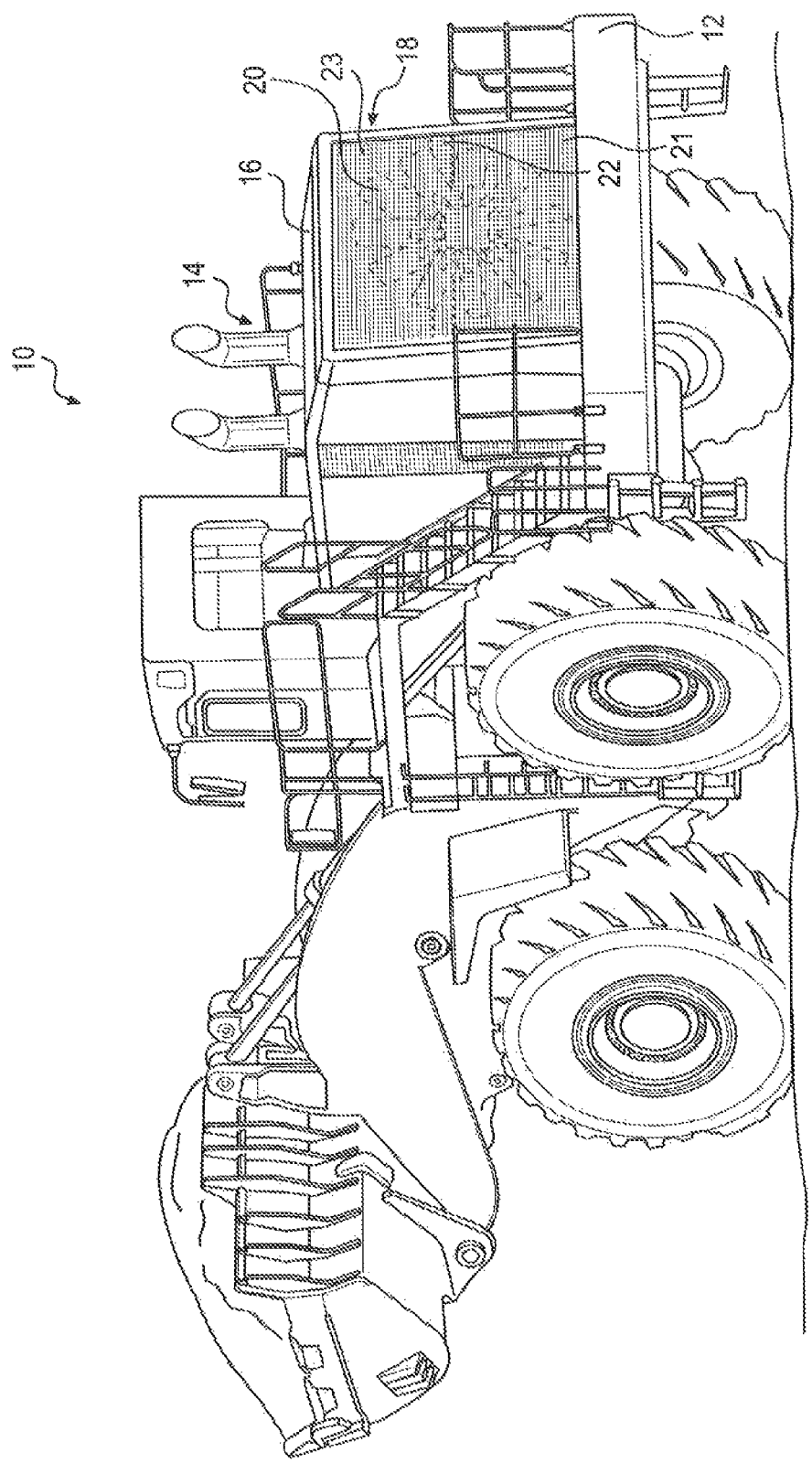
FIG. 1 is an isometric illustration of an exemplary disclosed machine and heat exchanger.

FIG. 1 illustrates an exemplary embodiment of a machine 10. Machine 10 may be a stationary or mobile machine that performs some type of operation associated with an industry such as mining, construction, farming, transportation, petroleum reclamation, or another industry known in the art. For example, machine 10 may be an earth moving machine such as the wheel loader shown in FIG. 1, a mining truck, a motor grader, a track-type tractor, a haul truck, or another type of mobile machine. Alternatively, machine 10 may be associated with electric power generation, fluid (e.g., oil, water, gas, etc.) pumping, or another stationary application, if desired. Machine 10 may include a frame 12 that supports an engine 14 within an enclosure 16. Enclosure 16 may be provided with one or more air inlets configured to allow air flow through at least a section of enclosure 16 for cooling purposes, as will be described in more detail below.

Machine 10 may be equipped with a cooling arrangement that communicates with the air inlets of enclosure 16 to facilitate the production of power within engine 14. The cooling arrangement may include, among other things, a heat exchanger 18 within enclosure 16 and fluidly connected to engine 14, and a fan 20 disposed within enclosure 16, adjacent to heat exchanger 18. Heat exchanger 18 may include, among other things, one or more engine oil coolers, one or more air coolers, one or more transmission oil coolers, one or more HVAC coolers, or any other types of coolers known in the art.

In the disclosed embodiment, heat exchanger 18 is a multi-component heat exchanger. For example, as shown in FIG. 1, heat exchanger 18 may include a lower section 21 that is supported by frame 12, and an upper section 23 that is mounted above lower section 21. In addition, a tank 22 may be disposed between lower and upper sections 21, 23, and be fluidly connected to lower and upper sections 21, 23 to provide a reservoir for fluids passing through heat exchanger 18. It is contemplated that, in some embodiments, additional tanks (not shown) may be provided above and/or below lower and upper sections 21, 23 as desired. The specific arrangement of heat exchanger 18 may be dependent upon the application of machine 10 and/or desired temperatures of the specific fluids passing through heat exchanger 18. For the purposes of this disclosure, references made herein to upper or lower, above or below, vertical or horizontal, and gravitationally higher or lower may refer to respective positions once heat exchanger 18 is assembled to machine 10 and configured for use (e.g., as shown in FIG. 1).

Heat exchanger 18 may be configured to dissipate heat from the primary fluids passing therein to the flow of air generated by fan 20. These primary fluids may be water, glycol, a water/glycol mixture, air, a blended air mixture, or oil (e.g., engine oil hydraulic oil, transmission oil, brake oil, etc.). Heat exchanger 18 may be a liquid-to-air type of exchanger or an air-to-air type of heat exchanger, as desired. In either of these embodiments, the flow of air generated by fan 20 may be drawn from the air inlets through channels of the respective heat exchanger 18, such that heat from the primary fluids within adjacent channels is transferred to the air. In this manner, the primary fluids passing through other components of machine 10 may be cooled to desired operating temperatures. While fan 20, in the disclosed exemplary embodiment, is situated to draw the flow of air through heat exchanger 18, it is contemplated that fan 20 could be alternatively situated to push the air through heat exchanger 18 and out the air inlets, if desired.

During operation of machine 10, heat exchanger 18 and/or tank 22 may experience vibrational forces, which can cause movement (e.g., flexing) of these components. This movement may be increased depending on the size and weight of heat exchanger 18 and tank 22. For example, heavier and larger heat exchangers tend to cause more flexing. In some situations, too much flexing may result in cracking, leakage, and/or failure of heat exchanger 18 and/or tank 22. In order to reduce the flexing and/or other movements, heat exchanger 18 and tank 22 may be equipped with one or more support assemblies to provide additional support for these components.

FIG. 2A illustrates one exemplary disclosed support assembly 24. It should be noted that heat exchanger 18 has been removed from FIG. 2A for clarity. As shown in FIG. 2A, support assembly 24 may include a frame 26 that is configured to receive heat exchanger 18 and tank 22. Frame 26 may include a top section 28 oriented generally upward with respect to gravity, a bottom section 30 positioned gravitationally lower than top section 28, and opposing side sections 32, 34. Frame 26 may be positioned inward of and connected to frame 12 of machine 10. Specifically, frame 12 may include a top section 36 connected to top section 28, and opposing side sections 38, 40 connected to side sections 32, 34, respectively. Frame 26 may be connected to frame 12 via welds or any fastener known in the art (e.g., bolts). It is contemplated that, in some embodiments, frame 12 may also include a bottom section connected to bottom section 30, although one is not shown in FIG. 2A.

As shown in FIG. 2A, support assembly 24 may also include one or more cross bars 43 and a vertical bar 45 (e.g., a tension bar). In the disclosed embodiment, support assembly 24 includes two cross bars 43. In particular, one cross bar 43 may be associated with lower section 21 of heat exchanger 18, while the other cross bar 43 is associated with upper section 23 of heat exchanger 18. Cross bars 43 may extend between side sections 32, 34, while vertical bar 45 extends between top section 28 and bottom section 30. Cross bars 43 and vertical bar 45 may be configured to support heat exchanger 18 once it is installed within frame 26. Support assembly 24 may further include one or more fan guards 44 configured to support fan 20 and/or a motor 42 associated with fan 20. In the disclosed embodiment, support assembly 24 includes two fan guards 44 extending between side sections 32, 34. In particular, one of the two fan guards 44 may be positioned gravitationally higher than motor 42, while the other fan guard 44 is positioned gravitationally lower than motor 42. One or more fasteners known in the art may be used to mount cross bars 43, vertical bar 45, and/or fan guards 44 to their respective sections of frame 26.

In some embodiments, support assembly 24 may include one or more additional support assemblies 46. In the disclosed embodiment, support assembly 24 may include two additional support assemblies 46 located at opposing side sections 32, 34 of frame 26. FIGS. 2B and 2C illustrate enlarged illustrations of one additional support assembly 46. It should be noted that side section 38, fan 20, and fan guards 44 have been removed from FIG. 2B for clarity. As shown in FIGS. 2B and 2C, support assembly 46 may include one or more support members configured to provide additional support for heat exchanger 18 and tank 22. Specifically, support assembly 46 may include a first bracket 48 configured to mount tank 22 to side section 32, and a second bracket 50 configured to mount side section 32 to side section 38. Likewise, the opposing support assembly 46 may also include a first bracket 48 configured to mount tank 22 to side section 34, and a second bracket 50 configured to mount side section 34 to side section 40.

Bracket 48 may have a generally L-shaped body including a first portion 52 that is mounted to side section 32, and a second portion 54 that is mounted to tank 22 (shown in FIG. 2B). Portion 54 may be generally perpendicular to portion 52 and extend substantially along a longitudinal axis of tank 22. Bracket 50 may also have a generally L-shaped body including a first portion 58 that mounts to side section 32, and a second portion 60 that mounts to side section 38 (shown in FIG. 2C). Portion 60 may be generally perpendicular to portion 58. One or more fasteners 56 (e.g., bolts) may be used to secure bracket 48 to tank 22, while one or more fasteners 62 (e.g., bolts) may be used to secure bracket 50 to side section 32 and side section 38. In the disclosed embodiment, brackets 48, 50 are connected to one another using the same fasteners 62. This particular connection may help to further secure tank 22.

Additional support assemblies 46 may help to reduce flexing and/or other movements of heat exchanger 18 and tank 22. By mounting tank 22 to side section 32 via bracket 48, flexure of tank 22 may be reduced. For example, because bracket 48 extends along a longitudinal axis of tank 22, an effective length of tank 22 may be reduced. More specifically, by supporting tank 22 at locations extending towards a center of tank 22, tank 22 may effectively have a shorter length subject to flexing in various directions (e.g., forward, backward, upward, and downward). Further, in some embodiments, a height of bracket 48 (i.e., length in a vertical direction) may be less than or equal to a height of tank 22. This may help to avoid restricting air flow that is drawn through heat exchanger 18, and thus, prevent a reduction in efficiency of heat exchanger 18. Additionally, by mounting frame 26 to frame 12 via bracket 50, this may provide additional strength to reduce flexing of frame 26 as well. In particular, this additional support may dampen a vibrational resonance of frame 26 caused by movements of machine 10.

FIG. 3A illustrates another exemplary disclosed support assembly 70. It should be noted that frame 12, heat exchanger 18, fan 20, motor 42, and fan guards 44 have been removed from FIG. 3A for clarity. As shown in FIG. 3A, support assembly 70 may include one or more structural members configured to provide additional support for heat exchanger 18 and tank 22. For example, as shown in FIG. 3B, a first gusset 74 may be configured to mount vertical bar 45 to tank 22. Specifically, gusset 74 may include a horizontal portion 76 connected to tank 22, and a vertical portion 78 connected to vertical bar 45. One or more fasteners 79 (e.g., screws) may be used to secure gusset 74 to tank 22 and vertical bar 45. In the disclosed embodiment, two gussets 74 are provided on opposing sides of heat exchanger 18. However, it is contemplated that only one gusset 74 may be used, if desired.

As shown in FIG. 3C, a second gusset 80 may be configured to mount vertical bar 45 to top section 28. Specifically, gusset 80 may include a horizontal portion 82 connected to top section 28, and a vertical portion 84 connected to vertical bar 45. One or more fasteners 86 (e.g., screws) may be used to secure gusset 80 to top section 28 and vertical bar 45. In the disclosed embodiment, two gussets 80 are provided on opposing sides of heat exchanger 18. However, it is contemplated that only one gusset 80 may be used, if desired. Also, in the disclosed embodiment, two additional gussets 80 are provided to mount vertical bar 45 to bottom section 30.

As shown in FIG. 3D, a third gusset 90 may be configured to mount tank 22 to side section 34. Specifically, gusset 90 may include a horizontal portion 92 connected to tank 22, and a vertical portion 94 connected to side section 34. One or more fasteners 96 (e.g., screws) may be used to secure gusset 90 to tank 22 and side section 34. In the disclosed embodiment, two gussets 90 are provided on opposing sides of heat exchanger 18. However, it is contemplated that only one gusset 90 may be used, if desired. Also, in the disclosed embodiment, two additional gussets 90 are provided to mount tank 22 to side section 32.

Support assembly 70 may provide additional support for heat exchanger 18 and tank 22 to prevent flexing and/or other movements of these components. In particular, gussets 74 may provide additional support in critical areas (e.g., at a lengthwise center of tank 22) that are often more prone to flexing. Additionally, gussets 80 and 90 may provide support at top, bottom, and side locations of heat exchanger 18 and tank 22. This additional support may also help to reduce flexing of tank 22 and/or heat exchanger 18.

FIG. 4A illustrates yet another exemplary disclosed support assembly 100. Similar to FIG. 3A, frame 12, heat exchanger 18, fan 20, motor 42, and fan guards 44 have been removed from FIG. 4A for clarity. As shown in FIG. 4A, support assembly 100 may be configured to provide additional support for heat exchanger 18 and tank 22. For example, support assembly 100 may include a first vertical bar 104 extending between top section 28 and tank 22, and a second vertical bar 106 extending between tank 22 and bottom section 30. As shown in FIG. 4B, a clamp 108 may be connected to vertical bar 104 at a first end, and connected to vertical bar 106 at a second end. Clamp 108 may be configured to receive tank 22, such that a clamping force is applied to secure tank 22 to vertical bars 104, 106. One or more fasteners 109 (e.g., bolts) may be used to secure clamp 108 to vertical bars 104, 106.

Support assembly 100 may also include one or more pin pin-joint assemblies 102 that provide a flexible connection between tank 22 and frame 26. For example, as shown in FIG. 4B, a first pin-joint assembly 102 may be located at an intersection between vertical bars 104, 106 and tank 22. The first pin-joint assembly 102 may include a first joint 110 that connects vertical bar 106 to a first support member 112 via a first pin 111, and a second joint 114 that connects vertical bar 104 to a second support member 116 via a second pin 115. Support members 112, 116 may be connected to clamp 108 via fasteners 109. Joints 110, 114 may be configured to allow relatively small, controlled movements of tank 22 relative to frame 26.

As shown in FIG. 4C, a second pin-joint assembly 102 may be located at an intersection between vertical bar 104 and top section 28. The second pin-joint assembly 102 may include a third joint 118 that connects vertical bar 104 to a third support member 120 via a third pin 119. Support member 120 may be fixedly connected to an additional tank 122 connected to top section 28 via one or more fasteners 124 (e.g., bolts). Tank 122 may be structurally similar to tank 22. Joint 118 may also be configured to allow relatively small, controlled movements of tank 22 relative to frame 26. In the disclosed embodiment, a third pin-joint assembly 102, similar to the second pin-joint assembly 102, is located at an intersection between vertical bar 106 and bottom section 30.

Support assembly 100 may provide a flexible connection between tank 22 and frame 26. Consequently, rather than restricting all movement of these components, support assembly 100 may allow relatively small, controlled movements of tank 22 relative to frame 26. This controlled movement may allow some movement, but at the same time, prevent larger and potentially more damaging movement of heat exchanger 18 and/or tank 22.

INDUSTRIAL APPLICABILITY

The disclosed support assemblies may be applicable for use with any type and configuration of heat exchangers known in the art. The disclosed support assemblies may be particularly applicable to multi-component heat exchangers having one or more tanks connected to the heat exchangers. The disclosed support assemblies may provide increased support for the heat exchanger and the tank to reduce flexing and/or other movements of the heat exchanger and the tanks. In particular, support assembly 24 may include bracket 48 to mount tank 22 to heat exchanger frame 26, and bracket 50 to mount heat exchanger frame 26 to machine frame 12, thereby reducing flexing of tank 22 and frame 26. In addition, support assembly 70 may include gussets 74, 80, 90 to provide increased support in critical areas of tank 22. Finally, support assembly 100 may include pin-joint assemblies 102 to provide a flexible connection between tank 22 and frame 26 to allow relatively small, controlled movements of tank 22.

It will be apparent to those skilled in the art that various modifications and variations can be made to the disclosed support assembly without departing from the scope of the disclosure. Other embodiments of the support assembly will be apparent to those skilled in the art from consideration of the specification and practice of the cleaning disclosed herein. For example, one or more additional embodiments may be contemplated based on various combinations of support assemblies 24, 70, 100. It is intended that the specification and examples be considered as exemplary only, with a true scope of the disclosure being indicated by the following claims and their equivalents.

What is claimed is:

1. A heat exchanger support assembly for a machine, cornprising:
    a heat exchanger frame configured to receive a heat exchanger, and having a top section, a bottom section, and first and second side sections, the top, bottom, and first and second side sections forming an opening defining a flow path extending in a horizontal flow path direction through the frame, for air to flow through the heat exchanger frame and through a heat exchanger coupled to the heat exchanger frame to exchange heat with a heat exchange fluid conveyed through the heat exchanger;
    a tank providing a reservoir for the heat exchange fluid, the tank defining a longitudinal axis and being positioned within the flow path at a location that is vertically between the top section and the bottom section of the heat exchanger frame, such that a first portion of the flow path extends vertically between a ton surface of the tank and the top section of the frame and a second portion of the flow path extends vertically between a bottom section of the tank and the bottom section of the frame;
    a fan supported by the heat exchanger frame and defining an axis of rotation that is parallel to the horizontal flow path direction such that the fan is configured to convey air in the horizontal flow path direction through each of the first portion of the flow path and the second portion of the flow path:
    a machine frame configured to receive the heat exchanger frame;
    a first bracket mounting the tank to the heat exchanger frame; and
    a second bracket mounting the heat exchanger frame to the machine frame, the first bracket and the second bracket being positioned upon opposite sides of the heat exchanger frame and the second bracket being fastened to the first bracket;
    the first bracket extending substantially along the longitudinal axis of the tank, and being coupled to the tank such that the first bracket supports the tank at an outward location relatively further from a center of the tank and adjacent to the heat exchanger frame, and at an inward location relatively closer to the center of the tank.

2. The heat exchanger support assembly of claim 1, wherein:
    the first bracket includes two brackets configured to mount the tank to first and second side sections of the heat exchanger frame; and
    the second bracket includes two brackets configured to mount the first and second side section of the heat exchanger frame to first and second side sections of the machine frame.

3. The heat exchanger support assembly of claim 1, wherein the first bracket has a generally L-shaped body including:
    a first portion that is mounted to the first side section of the heat exchanger frame; and
    a second portion that is mounted to the tank, the second portion being generally perpendicular to the first portion.

4. The heat exchanger support assembly of claim 1, wherein
    the second bracket has a generally L-shaped body including;
    a first portion that is mounted to the first side section of the heat exchanger frame; and
    a second portion that is mounted to the machine frame, the second portion being generally perpendicular to the first portion.

5. The heat exchanger support assembly of claim 1, wherein
    a height of the first bracket is less than or equal to a height of the tank.

6. A machine, comprising:
    a machine frame;
    a heat exchanger including a lower section supported by the machine frame, and an upper section mounted above the lower section;
    a fan located at one side of the heat exchanger and configured to generate a flow of air through the heat exchanger;
    a tank fluidly connected to the lower and upper sections to provide a reservoir for fluids passing through the heat exchanger;
    a heat exchanger frame positioned inward of the machine frame and configured to receive the heat exchanger, the heat exchanger frame having a top section, a bottom section, and first and second side sections, the top, bottom, and first and second side sections forming an opening defining a flow path extending in a horizontal flow path direction through the frame, for air to flow through the heat exchanger frame and through the heat exchanger to exchange heat with the fluids passing through the heat exchanger;
    a first bracket mounting the tank to the heat exchanger frame; and a second bracket mounting the heat exchanger frame to the machine frame, the first bracket and the second bracket being positioned upon opposite sides of the heat exchanger frame and the second bracket being fastened to the first bracket;

the tank defining a longitudinal axis and being mounted to the heat exchanger frame at a location within the flow path and vertically between the top section and the bottom section of the heat exchanger frame, such that a first portion of the flow path extends vertically between a top surface of the tank and the top section of the frame and a second portion of the flow path extends vertically between a bottom section of the tank and the bottom section of the frame;

the fan defining an axis of rotation that is parallel to the horizontal flow path direction, such that the fan is configured to convey air in the horizontal flow ath direction through each of the first portion of the flow path and the second portion of the flow path; and the first bracket extending substantially along the longitudinal axis of the tank, and being coupled to the tank such that the first bracket supports the tank at an outward location relatively further from a center of the tank and adjacent to the heat exchanger frame, and at an inward location relatively closer to the center of the tank.

* * * * *